ANN MALIN.
Frying-Pan.
No. 166,120. Patented July 27, 1875.
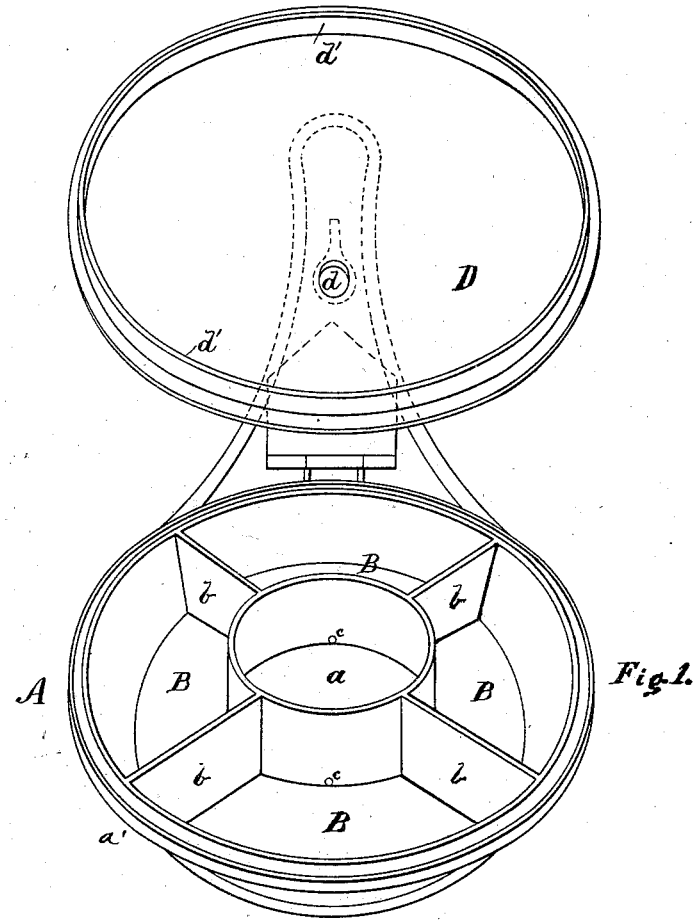
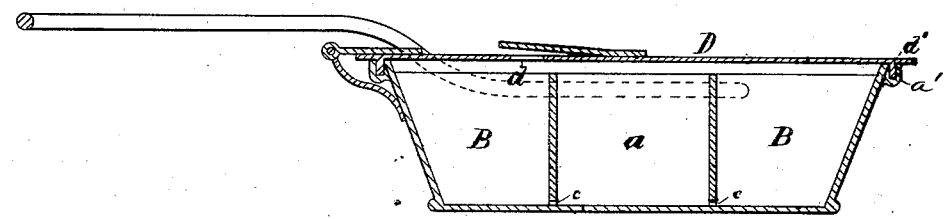

UNITED STATES PATENT OFFICE.

ANN MALIN, OF DARBY, PENNSYLVANIA.

IMPROVEMENT IN FRYING-PANS.

Specification forming part of Letters Patent No. 166,120, dated July 27, 1875; application filed June 12, 1875.

*To all whom it may concern:*

Be it known that I, ANN MALIN, of Darby, in the county of Delaware and State of Pennsylvania, have invented certain new and useful Improvements in Frying-Pans; and I do hereby declare the following to be a full, clear, and exact description of the invention, such as will enable others skilled in the art to which it pertains to make and use it, reference being had to the accompanying drawings, which form part of this specification, in which—

Figure 1 is a perspective of the invention. Fig. 2 is a vertical longitudinal section.

The object of my invention is to provide a frying-pan in which several different articles may, without being brought in contact with each other, be fried at the same time. A further object of my invention is to provide means for gradually and automatically supplying grease in an economical manner to the various articles being fried. A still further object of my invention is to make the frying process more rapid than heretofore.

My invention consists of a frying-pan having a central fountain for containing grease, and divided into various compartments by radial partitions, into which the articles to be fried are placed, said fountain and compartments communicating by suitable openings in the wall of the former.

Referring to the accompanying drawing, A shows a frying-pan, formed with a central well or fountain, $a$, from which proceed radial partitions $b\ b$, &c., dividing the pan into several compartments, B B, &c., which communicate with the well $a$ by means of apertures, $c\ c$, &c. D represents a hinged lid, having a safety-valve, $d$, to permit the escape of steam, and a peripheral flange, $d'$, which fits in a groove, $a'$, around the upper edge of the pan A, forming a steam-tight joint.

The well or fountain is to be supplied with grease or other lubricant, and the various articles to be fried placed separately in different compartments, B B. The hinged lid is now tightly closed and the pan placed over the fire. The grease, as fast as required, will slowly pass through the apertures $c\ c$ from the fountain $a$ into the compartments B B. The closed lid will serve to lessen the escape of heat, thus causing the articles to fry more quickly than when uncovered, while the valve $d$ will avert danger by permitting the escape of steam.

The upper edge of the partitions B B should be a trifle below the edge of the pan, so as to permit the escape of steam from the remote compartments through the valve $d$.

In some cases, as those skilled in the art of frying will best understand, it may be desirable, after having put grease in the fountain, and before placing the articles to be fried in their respective compartments, to hold the pan over the fire for a few moments, so as to grease the bottom.

What I claim as my invention is—

1. As a new article of manufacture, a frying-pan divided into compartments, and having a grease-fountain communicating laterally with said compartments, substantially as set forth.

2. In combination with a frying-pan, A, a grease well or fountain, $a$, substantially as shown and described.

In testimony that I claim the foregoing I have hereunto set my hand this 4th day of June, 1875.

ANN MALIN.

Witnesses:
   GEO. C. SHELMERDINE,
   M. DANL. CONNOLLY.